(12) United States Patent
Cicchiello (10) Patent No.: US 6,958,851 B2
(45) Date of Patent: Oct. 25, 2005

(54) ELECTRONICALLY MODULATED PRISM

(75) Inventor: James M. Cicchiello, Cary, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 22 days.

(21) Appl. No.: 10/727,248

(22) Filed: Dec. 3, 2003

(65) Prior Publication Data

US 2005/0122566 A1 Jun. 9, 2005

(51) Int. Cl.$^7$ ............................ G02B 26/08; G02F 1/29
(52) U.S. Cl. ...................................... 359/298; 359/322
(58) Field of Search ............................... 359/298, 245, 359/246, 316, 320, 322, 323, 315; 385/36, 40; 398/188

(56) References Cited

U.S. PATENT DOCUMENTS 6,697,550 B2 * 2/2004 Chen ........................... 385/22

OTHER PUBLICATIONS

J.C. Carrano, DARPA/MTO, Steered Agile Beams (STAB) Aug. 2000.

A.M. Prokhorov & Y.S. Kuz'Minov, Physics and Chemistry of Crystalline Lithium Niobate, 1990, pp 290 & 369, Adam Hilger, New York, USA.

K.W. Chang, et al., Simultaneous Wavelength Conversion and Amplitude Modification in a Monolithic Periodically–poled Lithium Niobate, Mar. 2002, pp. 163–168, Optics Communication 203.

R.A. Soref & D.H. McMahon, Bright Hopes for Display Systems: Flat Panels and Light Deflectors, Optoelectronics, Nov. 1965, pp. 56–62 Mass., USA.

* cited by examiner

Primary Examiner—Scott J. Sugarman
Assistant Examiner—Richard Hanig
(74) Attorney, Agent, or Firm—Stetina Brunda Garred & Brucker (57) ABSTRACT

An electronically modulated prism, having a bulk crystal, a plurality of electrode pads formed on a top surface of the bulk crystal, and a common electrode formed on a bottom surface of the bulk crystal. The bulk crystal is optically isotropic with zero electric field applied thereto and optically anisotropic when subjected to a non-zero electric field. More specifically, the bulk crystal between each of the electrode pads and the common electrode has an index of fraction altered proportionally to the electric field applied thereto, such that an incident beam propagate through the crystal is modulated with an accumulated phase shift.

34 Claims, 4 Drawing Sheets

ELECTRONICALLY MODULATED PRISM

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates in generally to an electronically modulated prism, and more particularly, to a scalable and agile beam-steering device that uses an electronically modulated prism.

Precise and controllable delivery of light beams or other guided modes to a desired location has been an important topic with telecommunication, military and other general industrial applications. In the military application, the beam steering is a critical technique in an airborne, active, electro-optical (EO) system. Examples of missions requiring the beam steering technique include self-protection, such as infrared countermeasures (IRCM) and damage-and-degrade ($D^2$) applications, targeting, intelligence, surveillance, and reconnaissance (ISR), infrared search and track (IRST), laser radar (LADAR), vibrometry, and free-space optical (FSO) communication.

Each of the above listed missions requires a unique beam-steering subsystem to adjust field of regard (FOR), slew rate or switching speed, and an upper bound on allowable jitter thereof, for example. The typical field of regard which challenges the coarse-steering element of a loop will be 0° to 45° in elevation and 360° in azimuth. The slew rate varies from 0.5 second for coarse-steering elements to less than 0.001 second for fine-steering elements. The jitter which challenges the fine-steering element of the loop typically ranges from several mrads for the more forgiving missions to tens of $\mu$rads for the more challenging missions.

There has been recent interest in development of novel beam-steering approaches in the industry. These approaches progress in novelty from non-gimbal designs (which involve conventional turrets without gimbal) to non-mechanical designs (which use no moving parts or at least no moving parts on a macro scale critical to tracking function), conformal designs (which may use gimbals or other mechanical elements conformal to the skin of the aircraft), and agile designs (which are conformal, non-mechanical and fully-digitally selectable). The conformal designs are advantageous to reduction in aerodynamic drag and in the radar cross-section of the aircraft. The agile approach would constitute an analogue to the available electronically-steered radar.

Practical solutions for agile steering have been developed to maintain full-steering, coarse-steering and requisite fine-steering field of regard. A variety of solutions have been proposed for agile elements dedicated to fine steering. For example, flexible waveguides and Bragg gratings have been applied to fine steering in telecommunications. Liquid crystal (LC) arrays, micro electro-mechanical (MEM) based and segmented arrays of optical fibers have been proposed to address the fine-steering problems. The baseline of the evaluation of each of the above fine steering techniques could be the conventional fast-steering mirror (FSM), which is able to steer over 1° to 3° with closed-loop bandwidths of about 500 Hz to about 2000 Hz for small-angle corrections.

The more mature agile techniques are the array-based elements that achieve fine steering by managing phase differences on a fine scale. As known in the art, the phase of a light beam traveling through an optical medium can be expressed by:

$$\phi(x)=(2\pi/\lambda)OPD(x) \qquad (1),$$

where $\phi$ is the phase, $\lambda$ is the wavelength of the light beam, and OPD(x) is the optical-path difference along x-direction through the optical medium, which is either the lead or lag of a portion of the wavefront with respect to the rest of the light beam. Often time phase non-uniformity is undesirable, but can be used advantageously to steer a beam. A phase grating, for example, whether reflective or transmissive, and whether sinusoidal or blazed, can be used to deflect a portion of the incident wavefront in a chosen direction. Phased arrays of optical fibers, liquid-crystal arrays and MEMs based arrays can be used in this way for beam steering.

However, because these approaches lack the phase range, or "stroke" to modulate the whole wavefront sufficiently steer the incident light beam at a significant angle, the steering elements are subdivided into smaller arrays that operate on subaperture portions of the larger wavefront. The phases of these subaperture portions are locked or phased within a modulo of $2\pi$ shift. The subaperture division leads to undesired effects. For example, a wavefront that is subdivided will experience diffraction losses versus the original wavefront; and additionally, each subaperture will have a larger, far-field divergence compared to that of the original wavefront. One of the most vexing issues associated with the subaperture effect is the true time delay (TTD) experienced progressively across the wavefront. In the free-space optical communication missions or in any mission concerned with very fast ( about tens of Gb per second) modulation of waveforms, phasing of subapertures will cause some parts of the wavefront to reach the receiver detector at a later time than other parts of the wavefront, leading to signal "smearing" in time.

It is therefore a substantial need to develop an agile-steering element, at least for fine steering, which does not rely on the division of the steered wavefront into subapertures. The element will steer in the same fashion that a glass prism do for steering a beam. The agile-steering element can function as a dynamic prism.

BRIEF SUMMARY OF THE INVENTION

The present invention provides an agile beam steering system, comprising a beam generating device, an electronically modulated prism, and an electric field source. The beam generating device is operative to generate a light beam. The electronically modulated prism comprises a bulk crystal, having a top surface, a bottom surface and a plurality of side surfaces. The light beam is incident on one of the side surfaces and emerging from another of the side surfaces. The electronically modulated prism further comprises an array of electrode pads deposited on the top surface, and a common electrode formed on the bottom surface. The electric field source is operative to apply an adjustable electric field to each electrode of the array. The beam generating device includes a laser device, for example. The bulk crystal is preferably configured into a parallelepiped, such that the top surface is parallel to the bottom surface, the side surfaces are perpendicular to the top and bottom surfaces, and the side surface on which the light beam is incident is parallel to the side surface from which the light beam emerges.

The bulk crystal has electrically induced birefringence property. The bulk crystal is made of potassium dihydrogen phosphate, potassium dideuterium phosphate, ammonium dihydrogen phosphate, cadmium telluride, lithium tantalite, lithium niobate, gallium arsenide, or zinc selenide, for example. For these materials, the index of refraction varies proportional to the electric field applied along a direction perpendicular to the direction along which the light beam transmits. The common electrode is connected to ground, and preferably, the electrode pads are selectively connected to the electric field source.

The present invention also provides an electronically modulated prism, comprising a bulk crystal, a plurality of electrode pads formed on a top surface of the bulk crystal, and a common electrode formed on a bottom surface of the bulk crystal. The bulk crystal is optically isotropic with zero electric field applied thereto and optically anisotropic when subjected to a non-zero electric field. More specifically, the bulk crystal between each of the electrode pads and the common electrode has an index of fraction altered proportionally to the electric field applied thereto. The bulk crystal is fabricated from potassium dihydrogen phosphate, potassium dideuterium phosphate, ammonium dihydrogen phosphate, cadmium telluride, lithium tantalite, lithium niobate, gallium arsenide, or zinc selenide.

In one embodiment of the present invention, the bulk crystal has a thickness of about 1 mm, the electrode pads are arranged as an array, preferably an orthogonal array. The bulk crystal further includes a plurality of side surfaces perpendicular to the top and bottom surfaces. To modulate a beam propagating through the bulk crystal, the electrode pads are selectively connected to an electric field to induce local variations of index of refractions at various positions of the bulk crystal.

The present invention further provides an electronically modulated prism for modulating an incident beam transmitting therethrough, the electronically modulated prism is fabricated from a material operative to induce a plurality of local phase shifts of the incident beam by applying an electric field at selected positions across the material locally, and accumulate the local phase shifts along a propagation path of the incident beam. The material comprises potassium dihydrogen phosphate, potassium dideuterium phosphate, ammonium dihydrogen phosphate, cadmium telluride, lithium tantalite, lithium niobate, gallium arsenide, or zinc selenide.

The present invention further provides a beam steering system, comprising a source for generating a beam, a prism through which the beam propagates, and an electric field source selectively applying an electric field at various positions across the prism locally. The prism is fabricated from a material operative to induce a plurality of local phase shifts of the incident beam at the various positions and accumulate the local phase shifts along a propagation path of the beam. The electric field source is operative to generate an adjustable electric field locally at various positions across the prism. The material for fabricating the prism comprises potassium dihydrogen phosphate, potassium dideuterium phosphate, ammonium dihydrogen phosphate, cadmium telluride, lithium tantalite, lithium niobate, gallium arsenide, or zinc selenide.

The present invention provides a method of steering a beam comprising the following steps. A bulk crystal is fabricated from an electro-optic material. An incident beam is generated to propagate laterally through the bulk crystal. An electric field is generated and applied locally at various positions across the bulk crystal. In the method of steering a beam, the bulk crystal is fabricated from the electro-optic material operative to induce variation of index of refraction while being subjected to the electric field, such as potassium dihydrogen phosphate, potassium dideuterium phosphate, ammonium dihydrogen phosphate, cadmium telluride, lithium tantalite, lithium niobate, gallium arsenide, or zinc selenide. The step of fabricating the bulk crystal further comprises forming a plurality of electrode pads on a first surface of the bulk crystal and a common electrode on a second surface. The first surface is parallel to a propagation path of the incident beam, and the second surface is opposing to the first surface.

Therefore, by selectively applying the electric field to the electrode pads and the common electrode across the bulk crystal, local phase shifts of the incident beam are induced and accumulated along the propagation path of the incident beam. The method further comprises a step of adjusting the intensity of the electric field applied at various positions of the bulk crystal. Therefore, a fine steering of the incident beam can be achieved. In one embodiment of the present invention, the intensity of the electric field can be independently adjusted at each of the various positions.

In another embodiment of the present invention, a method of steering an incident beam comprises fabricating a bulk crystal from an electro-optic material, directing the incident beam to propagate laterally through the bulk crystal, and forming at least an propagating interface of the incident beam within the bulk crystal by applying an electric field with a first intensity at selected positions across the bulk crystal. The step of forming at least one propagation interface comprises applying the electric field with a second intensity different from the first intensity at unselected positions across the bulk crystal.

In one embodiment, a plurality of propagating interfaces of the incident beam may be formed within the bulk crystal by applying the electric field with different intensities at various positions across the bulk crystal.

BRIEF DESCRIPTION OF THE DRAWINGS

An illustrative and presently preferred embodiment of the invention is shown in the accompanying drawings in which.

DETAILED DESCRIPTION OF THE INVENTION

The present invention provides an electronically modulated prism (EMP) used in a beam steering system to achieve ultra-fast, agile and fine steering. The electronically modulated prism proposed in the present invention steers an incident beam in a similar fashion that a glass prism does, such that rather than phasing subapertures by modulo $2\pi$, the electronically modulated prism accumulates phase along the wavefront as whole. This facilitates agile steering at least over a fine angle without concern for additional diffraction, higher divergence or true time delay issues.

Figure 1:
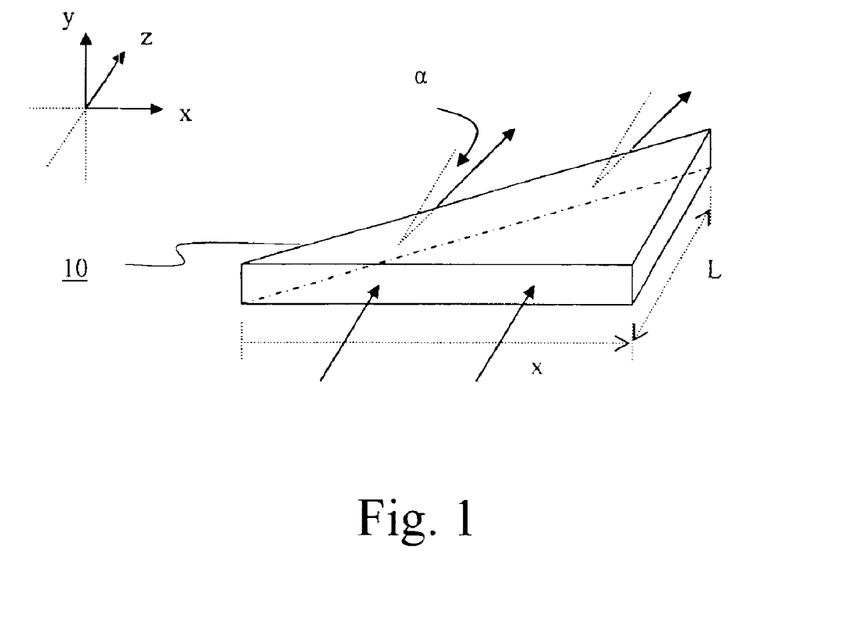
FIG. 1 shows a glass shaped into an optimally oriented prism for steering an incident beam.

FIG. 1 shows a glass or crystal is shaped into an optimally oriented prism 10. The shape of the prism 10 provides a gradient of optical-path difference (OPD) across the wavefront of the incident beam. Assuming that the index of refraction of the prism 10 is n, and the length of the prism through which the light beam transmits is L(x), the optical-path difference OPD(x) is:

$$OPD(x) = nL(x) \quad (2),$$

where L(x) is the length of the prism 10 at various points of the incident plane extending along x-direction. In the example as shown in FIG. 1, the maximum length of the prism L(x) is about 5 mm, and the angle between the incident surface and the transmitting surface is about 26°. If the index of refraction of the prism 10 is 1.5 and the wavelength $\lambda$ of the incident light beam is about 1.5 $\mu$m, the maximum optical-path difference is 7.5 mm, a maximum phase delay of 31,416 radians is induced, which results in a steering angle $\alpha$ of about 16° of the beam while emerging from the prism 10.

For the prism 10 as shown FIG. 1, the index of refraction is constant, and the difference of the length L(x) between the emerging plane and the incident plane of the incident beam provides the gradient of the optical-path difference OPD(x), such that the incident beam can be steered with a desired angle by changing the position on the incident plane where the incident beam impinges. By such design, a maximum phase error of tens of thousands of radians are required in order to steer a beam by about 10° to about 10°.

According to Equation (2), in addition to the geometry of the optical medium (the prism 10), the optical-path difference L(x) can also be controlled by variation of index of refraction of the optical medium. In other word, a light beam incident transmitting through an optical medium can be modulated by varying the index of refraction of the optical medium. Therefore, in the present invention, in addition to steering the angle of the incident beam by adjusting the length of the optical medium through which the incident beam travels, the index of refraction of the optical medium is altered by applying an external electric field thereto.

Figure 2:
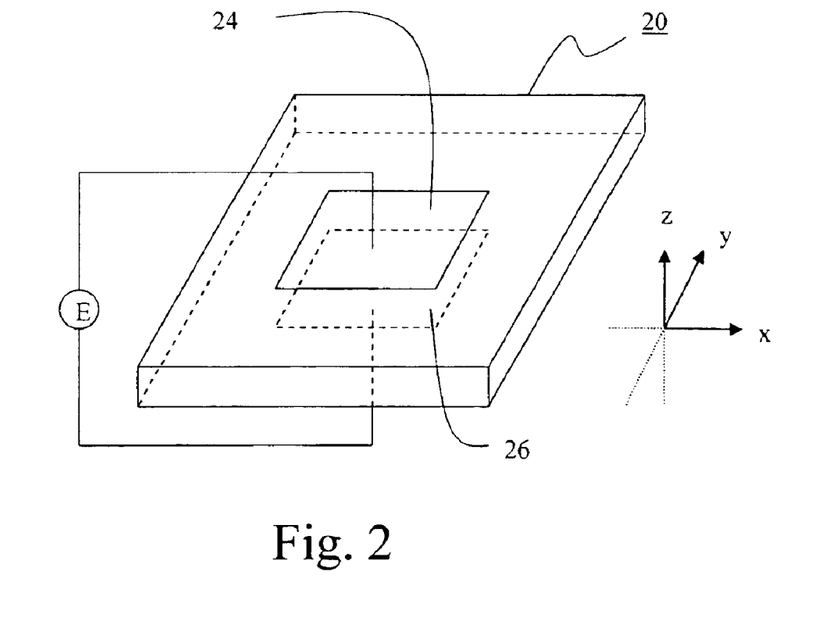
FIG. 2 shows a bulk crystal having a linear electro-optic property.
Figure 3:
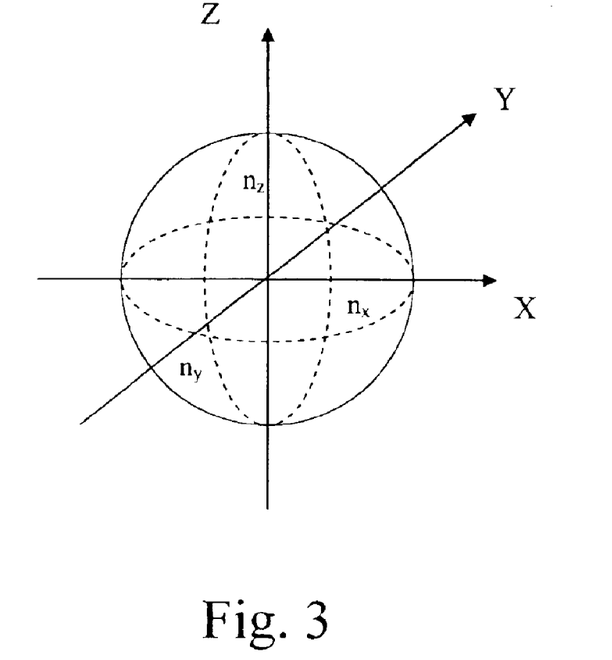
FIG. 3 shows the component index of refraction in a Cartesian coordinate when the bulk crystal as shown in FIG. 2 is not subjected to an external electric field.
Figure 4:
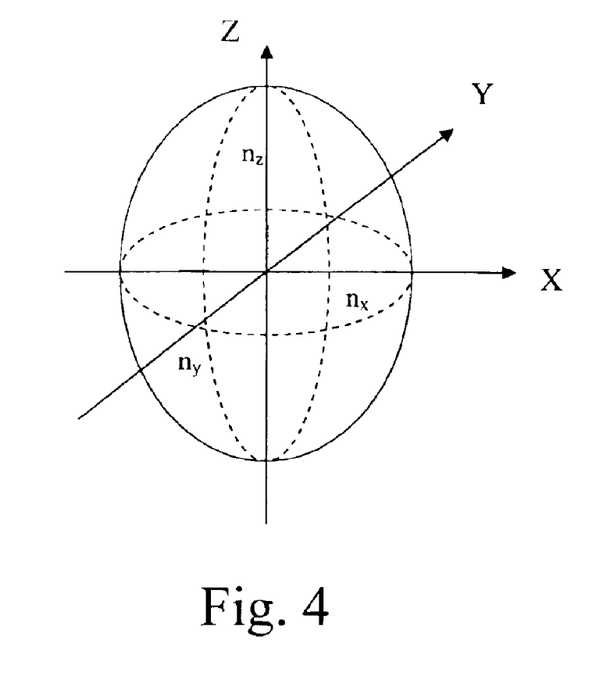
FIG. 4 shows the component index of refraction in a Cartesian coordinate when the bulk crystal as shown in FIG. 2 is subjected to an external electric field along the y-axis.

The optical medium is selected from the materials which are normally optically isotropic, but are optically anisotropic when subjected to an external electric field. For these types of materials, a birefringence property is induced by the external electric field. FIG. 2 shows a bulk crystal made of such material and the configuration for inducing electronically birefringence property thereof. FIG. 3 shows the index of refraction of the bulk crystal in a Cartesian coordinate when a zero electric field is applied thereto, and FIG. 4 shows index of refraction when the bulk crystal is subjected to a non-zero electric field along the z-axis.

As shown in FIG. 2, the bulk crystal 20 is shaped into a parallelepiped. An electrode pad 22 is formed on a top surface of the bulk crystal 20, and a ground electrode 24 is formed on the bottom surface of the bulk crystal 20. An electric field source is connected at the electrode pad 22 and the ground electrode 24, such that the electric field generated from the electric field source can be applied across the bulk crystal 20 along z-axis. When the electric field is zero, that is, when the bulk crystal 20 is not subjected to any electric field, as mentioned above, the bulk crystal 20 is optically isotropic. As shown in FIG. 3, the component indices of refraction $n_x$, $n_y$ and $n_z$ of the bulk crystal 20 along x-axis, y-axis and z-axis, respectively, are equal to the ordinary index of refraction no to construct a dielectric sphere as:

$$\frac{x^2}{n_o^2} + \frac{y^2}{n_o^2} + \frac{z^2}{n_o^2} = 1 \quad (3)$$

In contrast, when a non-zero electric field E is applied to the bulk crystal 20 along the z-axis, variations of the component indices of refraction are induced in the transverse plane of the electric field E, that is, the component indices of refraction $n_x$ and $n_y$ are altered as an extraordinary index of refraction $n_e$, the Equation (3) is modified as:

$$\frac{x^2}{n_e^2} + \frac{y^2}{n_e^2} + \frac{z^2}{n_o^2} = 1. \quad (4)$$

As a result, a dielectric ellipsoid is constructed as shown in FIG. 4, and the optical property of the bulk crystal 20 becomes anisotropic. The variations of index of refraction for electro-optic materials such as lithium niobate ($LiNbO_3$), lithium tantalite ($LiTaO_3$), cadmium telluride (CdTe), zinc telluride (ZnTe), gallium arsenide (GaAs), zinc sulfate (ZnSe), Cadmium sulfide (CdS), potassium dihydrogen phosphate ($KH_2PO_4$, KDP), potassium dideuterium phosphate ($KD_2PO_4$, KD*P), and ammonium dihydrogen phosphate ($AH_2PO_4$, ADP) is proportional to the electric field applied thereto. The relationship between the variation of index of refraction and the applied electric field can be expressed as:

$$\Delta n = (n_E - n_o) = pE \quad (5)$$

In Equation (5), p is the electro-optic coefficient of the corresponding material. Table I shows the electro-optic coefficients at room temperature and the refractive index at zero field for some materials.

TABLE I

| Material | Electro-optic coefficient p at room temperature r (cm/V × $10^{-10}$) | Refractive index at zero field |
|---|---|---|
| GaAs | 1.6 | 3.34 |
| ZnTe | 1.4 | 2.79 |
| ZnSe | 2.0 | 2.37 |
| CdTe | 6.8 | 2.6 |
| CdS | 5.5 | 2.3 |

The linear relationship between the variation of index of refraction of the bulk crystal 20 and the electric field E applied thereto allows one to adjust the index of refraction of the bulk crystal 20 between the electrode pad 22 and the ground electrode 24. Therefore, when a light beam travels through the portion of the bulk crystal 20 sandwiched by the electrode pad 22 and the ground electrode 24, the light beam is modulated with a phase delay proportional to the variation of the index of refraction according to Equation (2). As a result, the propagation direction of the light beam can be deflected with a desired angle according to Equation (1).

Figure 5:
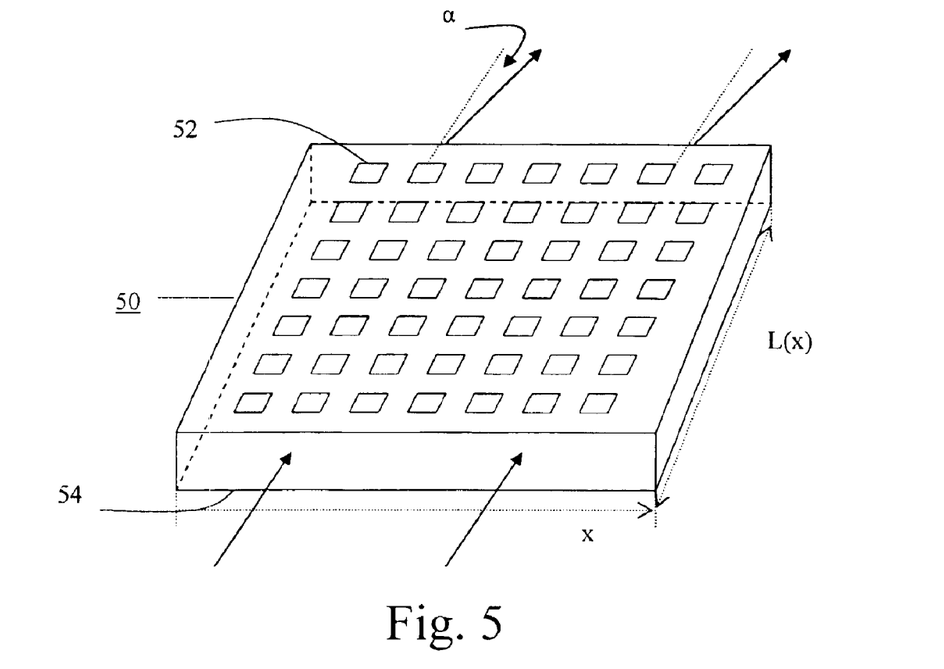
FIG. 5 shows an electronically modulated prism under one operation mode.
Figure 6:
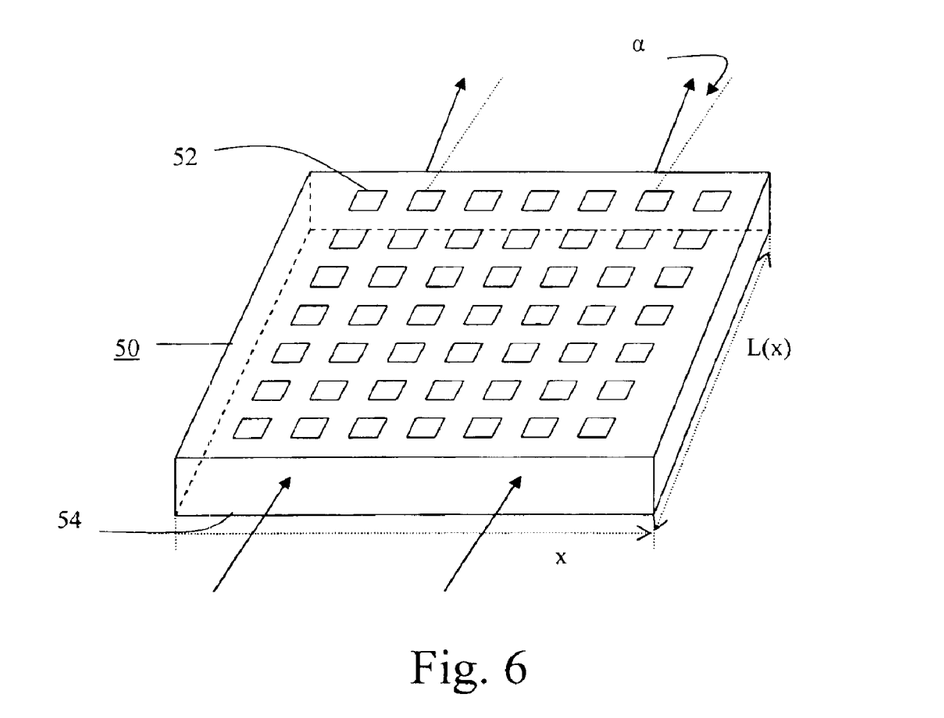
FIG. 6 shows the electronically modulated prism under another operation mode.
Figure 7:
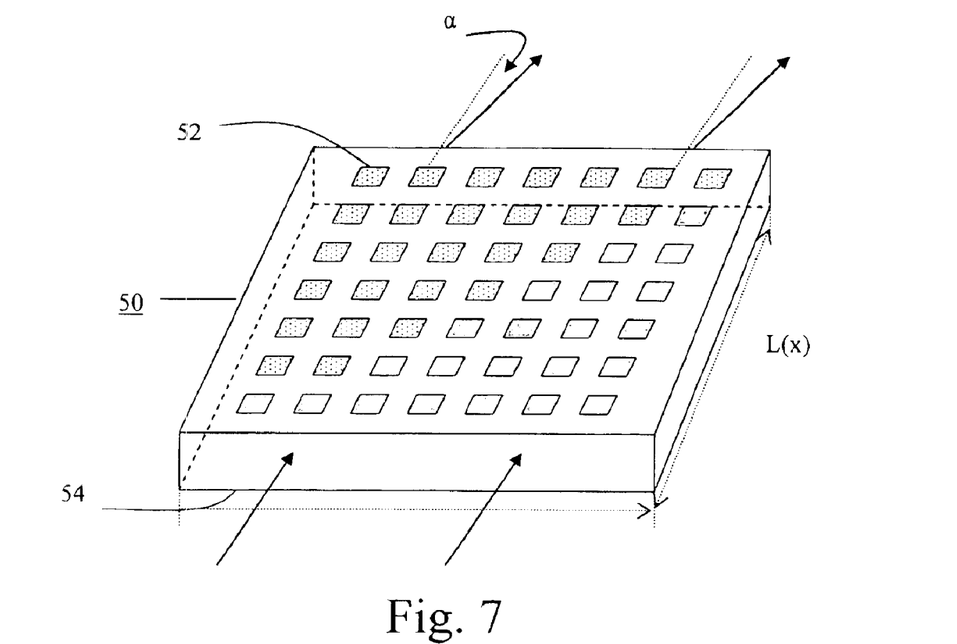
FIG. 7 shows the electronically modulated prism under another operation mode.

The present invention provides an electronically modulated prism of which the effective length L(x) for the incident beam to travel through and the index of refraction n can both be adjusted as required. As shown in FIGS. 5 to 7, the electronically modulated prism includes a bulk crystal 50 made of the materials with a non-zero electro-optic coefficient, which are normally optically isotropic, and optically anisotropic when being subjected to an electric field. In this embodiment, the thickness of the bulk 50 is about 1 mm. The bulk crystal 50 has a top surface, a bottom surface, and a plurality of side surfaces between the top surface and the bottom surface. Preferably, the side surfaces are perpendicular to the top surface and the bottom surface, and similar to the bulk crystal 20 as shown in FIG. 2, the bulk crystal 50 is shaped into a parallelepiped. On the top surface, an array of a plurality of electrode pads 52 are formed, and on the bottom surface, a common ground plate 54 is formed.

The electrode pads 52 are connected to one electrode of an electric field source, while the common ground plate 54 is connected to the other electrode of the electric field source. Each of the electrode pads 52 can be switched on or off independently, such that the index of refraction is altered at various positions of the bulk crystal 50 to generate local phase shifts on the incident beam traveling therethrough. In FIG. 5, the shaded electrode pads 52 under a diagonal line from the lower left corner to the upper right of the bulk crystal 50 are switched on. Therefore, the bulk crystal 50 sandwiched between the shaded electrode pads 52 and the common ground plate 54 is subjected to the electric field to induce variation in index of refraction $\Delta n$, and the index of refraction is modulated from the ordinary index of refraction $n_o$ to the extraordinary index of refraction $n_e$. In contrast, the electrode pads 52 above the diagonal line are not switched on, such that the index of refraction thereof remains as $n_o$. Therefore, an interface is formed between the shaded electrodes pads 52 under the diagonal line and the electrodes pads 52 over the diagonal line. This constructs a similar structure of the prism 10 as shown in FIG. 1, and a gradient of optical-path difference L(x) along the x-axis is produced. Therefore, a beam horizontally through the crystal bulk 20 is modulated in the same manner like the prism 10. Different from the prism 10 as shown in FIG. 1, the electronically modulated prism as shown in FIG. 5 is not only operative to provide the gradient of the optical-path difference L(x), but is also operative to adjust the refractive index thereof. Therefore, a fine steering effect can be achieved.

In the embodiment as illustrated in FIG. 5, the bulk crystal 50 is made of lithium niobate ($LiNbO_3$). The length, width, and thickness of the crystal bulk 50 are 10 mm, 10 mm, and 1 mm, respectively, and the dimension of each electrode pad 52 is 500 μm by 500 μm. When an electric field of about 5000 V/m is applied to the shaded electrode pads 52, a beam with a wavelength $\lambda$ equal to 1.55 μm will be modulated by a phase delay of $\pi$. As mentioned above, the electric field applied to the shaded electrode pads 52 directly affects the phase delay. That is, to obtain a longer phase delay, the electric field has to be increased. However, the electric field shall be controlled under a specific limit of the material for fabricating the bulk crystal to avoid dielectric breakdown.

FIG. 6 shows another operation mode of the electronically modulated prism of the present invention. As shown, opposite to the operation mode as shown in FIG. 5, the shaded electrode pads 52 over the diagonal line are switched on, while the electrode pads 52 under the diagonal line are switched off. This gives a reversed phase delay compared to FIG. 5. If a beam transmitting through the electronically modulated prism as shown in FIG. 5 is modulated with a deflection angle $\alpha$ of +0.5°, then the beam transmitting through the electronically modulated prism as shown in FIG. 6 is modulated with a deflection angle $\alpha$ of −0.5°.

In addition to the operation modes as shown in FIGS. 5 and 6, it is appreciated that the electrode pads 52 can be selectively switched on in any patterns to introduce a specific adjustment in optical-path difference. The electrode pads 52 as shown in FIGS. 5–7 are in rectangular shape. Other configurations such as triangle, circle, or spot can also be applied to the electrode pads 52 without exceeding the spirit and scope of the present invention. The shape of the bulk crystal 50, and the rows and columns of the array of the electrode pads 52 can also be modified according to specific requirements.

In addition to the modes of switching on the selected electrode pads 52 and switching off the remaining electrode pads 52 as described above, the electronically modulated prism may also modulate the incident beam by applying the electric field to all the electrode pads 52 with variable intensities. For example, as shown in FIG. 7, the dotted electrode pads 52 above the diagonal line are subjected to an electric field with a first intensity, while the shaded electrode pads 52 under the diagonal line are subjected to an electric field with a second intensity. The first intensity can be either larger or smaller than the second intensity, depending on the specific steering requirement. In any of the electronically modulated prisms as shown in FIGS. 5–7, one propagation interface for the incident beam is formed within the bulk crystal. According to specific requirement, more than one propagation interface may be formed within the bulk crystal 50. The multiple propagation interfaces may be achieved by applying electric field with various intensities to different groups of electrode pads 52.

From preliminary calculation, a steering angle of about 0.35° (about 6 mrad) can be achieved readily with optimization in material selection and tolerable applied electric fields for a 50 mm long crystal as described above, such that increase of field of regard can be expected. However, even without extension of field of regard, such fine steering could be very valuable when very fast, agile and fine steering is required.

Figure 8:
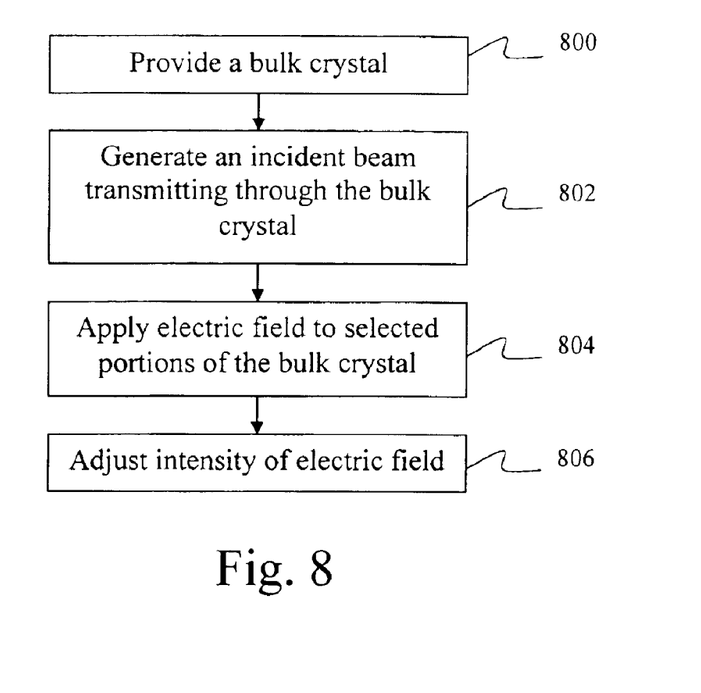
FIG. 8 shows the process of a beam steering method.

The present invention further provides a method for steering a beam as shown in FIG. 8. In step 800, a bulk crystal is provided. The bulk crystal is made of material operative to induce variation of index of refraction while being subjected to an external electric field. Preferably, an array of electrode pads are formed on one surface of the bulk crystal, and a common electrode is formed on the opposing surface thereof. In step 802, an incident beam, such as a laser beam, is generated from a source and transmits laterally through the bulk crystal. In this embodiment, the surface of the bulk crystal on which the beam is incident on is referred as the incident plane, and the surface from which the beam emerges from is referred as an emerging plane. Both of the incident plane and the emerging plane are perpendicular to the surfaces with the electrode pads and the common electrode formed thereon. In step 804, an electric field is applied to selected portions of the bulk crystal. Preferably, the electric field is applied along a direction perpendicular to the propagation path of the beam. As mentioned above, an array of electrode pads are formed on one surface of the bulk crystal. Therefore, in step 804, the electrodes at the selected portions of the bulk crystal are switched on, while the electrodes at the non-selected portions remain off. In this manner, a specific pattern of an electronically modulated prism is obtained to provide a gradient or variation of optical-path difference, and the beam traveling through the electronically modulated prism will be modulated by a phase delay. In step 806, a fine beam-steering adjustment of the incident beam can be achieved by adjusting the intensity of the electric field.

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A beam steering system, comprising:
   a beam generating device, operative to generate a light beam;
   an electronically modulated prism, comprising:
      a bulk crystal, having a top surface, a bottom surface and a plurality of side surfaces, wherein the light beam incident on one of the side surfaces and emerging from another of the side surfaces;
      an array of electrode pads deposited on the top surface; and
      a common electrode formed on the bottom surface; and
   an electric field source, operative to apply an adjustable electric field to each electrode of the array.

2. The beam steering system of claim 1, wherein the beam generating device includes a laser device.

3. The beam steering system of claim 1, wherein the bulk crystal is configured into a parallelepiped.

4. The beam steering system of claim 1, wherein the top surface is parallel to the bottom surface, and the side surfaces are perpendicular to the top and bottom surfaces.

5. The beam steering system of claim 4, wherein the side surface on which the light beam is incident is parallel to the side surface from which the light beam emerges.

6. The beam steering system of claim 1, wherein the bulk crystal has electrically induced birefringence property.

7. The beam steering system of claim 1, wherein the bulk crystal is made of potassium dihydrogen phosphate, potassium dideuterium phosphate, ammonium dihydrogen phosphate, cadmium telluride, lithium tantalite, lithium niobate, gallium arsenide, or zinc selenide.

8. The beam steering system of claim 1, wherein the bulk crystal is made from a material of which the index of refraction varies proportional to the electric field applied thereto.

9. The beam steering system of claim 1, wherein the electric field is operative to apply the electric field along a direction perpendicular to the direction along which the light beam transmits.

10. The beam steering system of claim 1, wherein the common electrode is connected to ground.

11. The beam steering system of claim 1, wherein the electrode pads are selectively connected to the electric field source.

12. An electronically modulated prism, comprising:
   a bulk crystal, the bulk crystal being optically isotropic with zero electric field applied thereto and optically anisotropic when subjected to a non-zero electric field;
   a plurality of electrode pads formed on a top surface of the bulk crystal; and
   a common electrode plate formed on a bottom surface of the bulk crystal.

13. The electronically modulated prism of claim 12, wherein the bulk crystal between each of the electrode pads and the common electrode has an index of refraction altered proportionally to the electric field applied thereto.

14. The electronically modulated prism of claim 12, wherein the bulk crystal is fabricated from potassium dihydrogen phosphate, potassium dideuterium phosphate, ammonium dihydrogen phosphate, cadmium telluride, lithium tantalite, lithium niobate, gallium arsenide, or zinc selenide.

15. The electronically modulated prism of claim 12, wherein the bulk crystal has a thickness of about 1 mm.

16. The electronically modulated prism of claim 12, wherein the electrode pads are arranged as an array.

17. The electronically modulated prism of claim 12, wherein the electrode pads are arranged as an orthogonal array.

18. The electronically modulated prism of claim 12, wherein the bulk crystal includes a plurality of side surfaces perpendicular to the top and bottom surfaces.

19. The electronically modulated prism of claim 12, wherein the electrode pads being selectively connected to an electric field to induce local variations of index of refractions at various positions of the bulk crystal.

20. An electronically modulated prism for modulating an incident beam transmitting therethrough, the electronically modulated prism being fabricated from a material operative to induce a variation of optical-path difference for the incident beam and changes of refractive index at selected positions of the material by applying an adjustable electric field at each of the selected positions across the material locally.

21. The electronically modulated prism of claim 20, wherein the material comprises potassium dihydrogen phosphate, potassium dideuterium phosphate, ammonium dihydrogen phosphate, cadmium telluride, lithium tantalite, lithium niobate, gallium arsenide, or zinc selenide.

22. A beam steering system, comprising:
   a source for generating a beam;
   a prism through which the beam propagates; and
   an electric field source, selectively applying an electric field at various positions across the prism locally; wherein
   the prism being fabricated from a material operative to induce a plurality of local phase shifts of the incident beam at the various positions and accumulate the local phase shifts along a propagation path of the beam.

23. The beam steering system of claim 22, wherein the electric field source is operative to generate an adjustable electric field locally at various positions across the prism.

24. The beam steering system of claim 22, wherein the material comprises potassium dihydrogen phosphate, potassium dideuterium phosphate, ammonium dihydrogen phosphate, cadmium telluride, lithium tantalite, lithium niobate, gallium arsenide, or zinc selenide.

25. A method of steering a beam, comprising:
   a) fabricating a prism from an electro-optic material;
   b) generating an incident beam to propagate laterally through the prism;
   c) generating an electric field; and
   d) applying the electric field locally at various positions across the prism.

26. The method of claim 25, wherein step (a) further comprising the fabricating the bulk crystal from the electro-optic material operative to induce variation of index of refraction while being subjected to the electric field.

27. The method of claim 25, wherein step (a) further comprising the fabricating the bulk crystal from the electro-optic material selected from one of the group consisting of potassium dihydrogen phosphate, potassium dideuterium phosphate, ammonium dihydrogen phosphate, cadmium telluride, lithium tantalite, lithium niobate, gallium arsenide, or zinc selenide.

28. The method of claim 25, wherein step (a) further comprises the following steps:
   forming a plurality of electrode pads on a first surface of the bulk crystal, wherein the first surface is parallel to a propagation path of the incident beam; and forming a common electrode on a second surface opposing to the first surface of the bulk crystal.

29. The method of claim 28, wherein step (d) further comprises selectively applying the electric field to the electrode pads and the common electrode across the bulk crystal.

30. The method of claim 25, further comprising a step of adjusting the intensity of the electric field applied at various positions of the bulk crystal.

31. The method of claim 30, further comprising independently adjusting the intensity of the electric field at each of the various positions.

32. A method of steering an incident beam, comprising:
   a) fabricating a bulk crystal from an electro-optic material;
   b) directing the incident beam to propagate laterally through the bulk crystal;
   c) forming at least one propagating interface of the incident beam within the bulk crystal by applying an electric field with a first intensity at selected positions across the bulk crystal.

33. The method of claim 32, wherein step (c) further comprises forming the propagating interface by applying the electric field with a second intensity different from the first intensity at unselected positions across the bulk crystal.

34. The method of claim 32, wherein step (c) further comprises forming a plurality of propagating interfaces of the incident beam within the bulk crystal by applying the electric field with different intensities at various positions across the bulk crystal.

* * * * *